(12) United States Patent
Pirri et al.

(10) Patent No.: US 8,816,008 B2
(45) Date of Patent: Aug. 26, 2014

(54) IMPACT MODIFIER AND IMPACT MODIFIED THERMOPLASTIC COMPOSITION

(75) Inventors: Rosangela Pirri, Montardon (FR); Stephane Girois, Norfolk, VA (US); Pascale Dargelos, Billere (FR); Magali Bergeret-Richaud, Villeurbanne (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/825,172

(22) PCT Filed: Sep. 20, 2011

(86) PCT No.: PCT/EP2011/066348
§ 371 (c)(1),
(2), (4) Date: Jun. 13, 2013

(87) PCT Pub. No.: WO2012/038441
PCT Pub. Date: Mar. 29, 2012

(65) Prior Publication Data
US 2013/0281629 A1    Oct. 24, 2013

(30) Foreign Application Priority Data
Sep. 22, 2010 (FR) ..................................... 10 57623

(51) Int. Cl.
*C08L 33/08* (2006.01)
*C08F 265/06* (2006.01)
*C08L 67/04* (2006.01)
*C08J 5/18* (2006.01)
*C08L 51/00* (2006.01)

(52) U.S. Cl.
CPC .............. *C08L 33/08* (2013.01); *C08J 2451/00* (2013.01); *C08L 67/04* (2013.01); *C08J 2367/04* (2013.01); *C08J 5/18* (2013.01); *C08L 51/003* (2013.01); *C08F 265/06* (2013.01); *Y10S 525/902* (2013.01)
USPC ................. 525/190; 525/64; 525/66; 525/67; 525/72; 525/85; 525/183; 525/185; 525/307; 525/309; 525/902

(58) Field of Classification Search
USPC ........... 525/64, 66, 67, 72, 85, 183, 190, 307, 525/309, 902
See application file for complete search history.

(56) References Cited

U.S. PATENT DOCUMENTS

| | | | |
|---|---|---|---|
| 5,773,520 A * | 6/1998 | Bertelo et al. | 525/309 |
| 6,534,592 B1 | 3/2003 | Chou et al. | |
| 6,759,480 B1 | 7/2004 | Bouilloux et al. | |
| 7,268,190 B2 * | 9/2007 | Ohme et al. | 525/400 |
| 8,183,321 B2 | 5/2012 | Babcock et al. | |
| 2009/0105399 A1 | 4/2009 | Schultes et al. | |
| 2010/0144971 A1 | 6/2010 | Babcock et al. | |
| 2011/0082224 A1 | 4/2011 | Cygan | |

FOREIGN PATENT DOCUMENTS

| | | |
|---|---|---|
| DE | 10 2005 055 793 A1 | 5/2007 |
| WO | WO 2007/057242 A1 | 5/2007 |
| WO | WO 2010/106267 A1 | 9/2010 |

* cited by examiner

*Primary Examiner* — Fred M Teskin
(74) *Attorney, Agent, or Firm* — Lynn B. Morreale

(57) ABSTRACT

The invention relates to an impact modified thermoplastic resin comprising a polymeric impact modifier with a core-shell structure comprising 2-octylacrylate.

16 Claims, No Drawings

IMPACT MODIFIER AND IMPACT MODIFIED THERMOPLASTIC COMPOSITION

CROSS-REFERENCE TO RELATED APPLICATIONS

This application is a national stage application under 35 U.C.S. §371 of PCT/EP2011/066348, filed Sep. 20, 2011, which claims benefit to FR application FR 1057623, filed on Sep. 22, 2010, which are hereby incorporated by reference in their entirety.

FIELD OF THE INVENTION

The present invention relates to an impact modifier comprising 2-octylacrylate.

The present invention also relates to impact-modified thermoplastic resins and in particular impact modified polylactid acid compositions.

More particularly the present invention relates to an impact modified thermoplastic resin comprising a polymeric impact modifier with a core-shell structure made by a multistage process comprising 2-octylacrylate.

BACKGROUND OF THE INVENTION

Impact modifiers are widely used to improve the impact strength for thermoplastics and thermosets with the aim to compensate their inherent brittleness or the embrittlement that occurs at ambient temperature but also and especially at sub zero temperatures, notch sensitivity and crack propagation. So an impact modified polymer is a polymeric material whose impact resistance and toughness have been increased by the incorporation of phase micro domains of a rubbery material. This is usually done due to the introduction of microscopic rubber particles into the polymer matrix that can absorb the energy of an impact or dissipate it and thereby improve the impact strength of the polymeric material. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix. One type of core-shell particles is acrylic core shell particles or acrylic impact modifiers (AIM).

The performance of the impact modification is a function of the particles size, especially of the rubber part of the particle, and its quantity or ratio to the shell and the thermal characteristics. There is an optimal average particle size in order to have the highest impact strength for a given quantity of added impact modifier particles.

Furthermore the thermal characteristics are important, in the case for having a rubber particle; the glass transition temperature (Tg) of the rubber has to be far below the application temperature. The Tg of the polymeric rubber particle is usually below 0° C.

An objective of the present invention is to provide a new impact modifier that performs better then the nowadays-available standard impact modifiers.

By better performance is meant that the impact modifier performs either better in terms of the impact strength used at the same quantity as the nowadays-available standard impact modifiers or the same impact strength is obtained by incorporating a less quantity of the impact modifier in comparison the nowadays-available standard impact modifiers in a thermoplastic resin, while keeping other characteristics.

Another objective of the present invention is to provide an impact modifier that has a significantly better impact performance while keeping a good compromise of processing quality once incorporated in a thermoplastic resin and an acceptable visual quality of the final part.

Still another objective is to provide an impact-modified composition that comprises at least one thermoplastic resin that has a significantly better impact performance.

Surprisingly it has been found that the use of 2-octylacrylate as monomer in the polymeric impact modifier increases significantly the impact strength of the thermoplastic resin, without loosing the other essential characteristics as processing and other characteristics and final technical performances.

The document EP1061100 discloses multilayer core-shell particles especially in the examples acrylic core shell impact modifiers having a core based on butyl acrylate and a shell based on methyl methacrylate.

The document WO2008/051443 describes impact modified polylactide resins. The impact modification and low haze is obtained by adding an acrylic core shell impact modifier in form of larger particles or agglomerates and smaller particles and agglomerates. The acrylic monomers given for the rubber phase of the impact modifier are butyl acrylate and 2-ethyl hexyl acrylate.

The document WO2009151977 discloses biodegradable impact modified polymer compositions. The compositions comprises acrylic core shell impact modifiers preferably the rubber core based on butyl acrylate, 2-ethyl hexyl acrylate and butadiene.

All prior art is completely silent about the 2-octylacrylate as acrylic monomer in an acrylic polymeric impact modifier and thermoplastic resin compositions comprising such an impact modifier.

SUMMARY OF THE INVENTION

Surprisingly it has been discovered that 2-octylacrylate as monomer in the polymeric impact modifier increases significantly the impact strength in comparison with impact modifiers using standard acrylic monomers or other alkyl acrylate monomers. It has been also discovered that compositions comprising at least one thermoplastic resin and the polymeric impact modifier comprising 2-octylacrylate have a better impact performance then the same compositions with standard acrylic impact modifiers while keeping other properties as processing.

The invention will be more clearly understood on reading the following detailed description, from the non-limiting examples of embodiments thereof.

DETAILED DESCRIPTION

In a first aspect, the present invention relates to an impact modifier comprising 2-octylacrylate, wherein the weight ratio of 2-octylacrylate in the impact modifier is at least 10 wt %, preferably at least 20 wt %, more preferably at least 25 wt %, advantageously at least 30% wt and most advantageously at least 35 wt %.

In a second aspect the present invention relates to an impact modifier comprising 2-octylacrylate, wherein the weight ratio of 2-octylacrylate in the impact modifier is between 10 wt % and 95 weight %, preferably between 20 wt % and 90 wt %, more preferably between 25 wt % and 85 wt %, advantageously between 30% wt and 80 wt % and most advantageously between 35 wt % and 75 wt %.

Another aspect of the invention is the core shell structure of the impact modifier.

A further aspect of the invention is an impact modified thermoplastic resin composition comprising an impact modifier containing 2-octylacrylate.

By the term "impact modifier" as used is denoted a material that once incorporated in a polymeric material increases the impact resistance and toughness of that polymeric material by phase micro domains of a rubbery material or rubber polymer.

By the term "core/shell polymer" as used is denoted a polymer having a core at which is grafted at least one polymeric shell By the term "rubber" as used is denoted to the thermodynamic state of the polymer above its glass transition.

By the term "rubber polymer" as used is denoted a polymer that has a glass transition temperature (Tg) below 10° C.

By <<multistage polymer>> as used is denoted a polymer formed in sequential fashion by a multi-stage emulsion polymerization process with at least two stages that are different in composition. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "alkyl(meth)acrylate" as used is denoted to both alkyl acrylate and alkyl methacrylate.

By the term "standard acrylic monomers" are denoted the commodities monomers as methyl acrylate, ethyl acrylate, n-butyl acrylate and 2-ethylhexyl acrylate.

By the term "copolymer" as used is denoted that the polymers consists of at least two different monomers.

The term nowadays available standard impact modifiers signifies methyl-butadiene-styrene (MBS), acrylonitrile-butadiene-styrene (ABS) polymers and acrylic impact modifiers (AIM) as impact modifiers. The standard AIM are usually in form or core shell polymers containing a rubber core and a hard shell, wherein the rubbery core is usually a homo- or a copolymer such as n-butyl-, ethyl-, isobutyl- or 2-ethylhexyl-acrylate. Homopolymers and copolymers of such lower alkyl acrylates are suitable rubbery core materials.

As regards the impact modifier according to the present invention, this is an acrylic core-shell polymer or acrylic impact modifier (AIM) comprising 2-octylacrylate. The impact modifier is in the form of fine particles having an elastomer or rubber core and at least one thermoplastic shell. The core shell particle might have more than one shell. At least the outer shell, in contact with the thermoplastic matrix, has a Tg greater then 25° C., preferably greater than 50° C. The weight average size of the whole particles being in general less than 1 µm and advantageously between 50 and 500 nm, preferably between 100 nm and 400 nm, and most preferably 150 nm and 350 nm, advantageously between 200 nm and 350 nm. The size of the rubber core is usually slightly smaller (from 10 nm to 30 nm) depending on the core shell ratio. By this is meant that the thickness of the shell or the shells is from 10 nm to 30 nm. The weight average particle size of the rubber core is advantageously between 20 and 490 nm, preferably between 70 nm and 390 nm, and most preferably 120 nm and 340 nm, advantageously between 170 nm and 340 nm.

The impact modifier is prepared by emulsion polymerization. For example a suitable method is a two-stage polymerization technique in which the core and shell are produced in two sequential emulsion polymerization stages.

The core shell ratio is not particularly limited, but preferably in a range between 10/90 and 90/10, more preferably 40/60 and 90/10 advantageously 60/40 to 90/10 and most advantageously between 70/30 and 95/15.

As regards the core of the core shell particle according to the present invention, the core may for example consist of:
2-octylacrylate homopolymer; or
copolymers of 2-octylacrylate with a monomer chosen from another alkyl(meth)acrylate and a vinyl monomer or mixtures thereof.

In a preferred embodiment the elastomer of the core is an acrylic copolymer. By "acrylic" is meant that the primary monomer(s) used in forming the elastomeric polymer are acrylic monomers including 2-octylacrylate. Preferably the acrylic copolymer contains at least 80 percent by weight of acrylic monomer units. The other comonomer or comonomers are chosen from vinyl monomers and alkyl methacrylate monomers.

Examples of acrylic comonomers beside 2-octylacrylate useful in the invention include, but are not limited to, alkyl acrylates include n-propyl acrylate, n-butyl acrylate, isobutyl acrylate, amyl acryloate, 2-methylbutyl acrylate, 2-ethylhexyl acrylate, n-hexyl acrylate, n-octyl acrylate, iso-octyl acrylate, n-decyl acrylate, n-dodecyl acrylate, 3,5,5-trimethylhexyl acrylate, propylheptyl acrylate. Especially preferred acrylic comonomers beside 2-octylacrylate include n-butyl acrylate, n-pentyl acrylate, n-hexyl acrylate, n-heptyl acrylate, 2-ethylhexylacrylate, and n-octyl acrylate and mixtures thereof. Butyl acrylate, 2-ethylhexyl acrylate, and n-octyl acrylate are most preferred.

The vinyl monomer may be styrene, an alkyl styrene, acrylonitrile, butadiene or isoprene.

Alkyl methacrylate monomers are preferably C2 to C12 alkyl methacylate monomers. Advantageously the alkyl methacrylate monomer is chosen from methyl methacrylate, ethyl methacrylate, n-propyl methacrylate, n-butyl methacrylate, n-hexyl methacrylate, n-heptyl methacrylate, 2-ethylhexylmethacrylate, n-octyl methacrylate and mixtures thereof.

The rubbery core is advantageously an all acrylic copolymer of 2-octylacrylate with a lower alkyl acrylate such as n-butyl-, ethyl-, isobutyl- or 2-ethylhexyl-acrylate. The alkyl acrylate is advantageously butyl acrylate or 2-ethylhexyl-acrylate or mixtures thereof. According to a more preferred embodiment, the comonomer of 2-octylacrylate is chosen among butyl acrylate and 2-ethylhexyl acrylate.

Advantageously, the elastomer core may be completely or partly crosslinked. It is sufficient to add at least one difunctional monomer during the preparation of the core. These monomers may be chosen from poly(meth)acrylic esters of polyols, such as butylene di(meth)acrylate and trimethylolpropane trimethacrylate. Other difunctional monomers may for example be divinylbenzene, trivinylbenzene, vinyl acrylate, allyl methacrylate and vinyl methacrylate. The core may also be crosslinked by introducing into it, by grafting or as comonomer during the polymerization, unsaturated functional monomers such as unsaturated carboxylic acid anhydrides, unsaturated carboxylic acids and unsaturated epoxides. As examples, mention may be made of maleic anhydride, (meth)acrylic acid and glycidyl methacrylate.

The glass transition temperature (Tg) of the elastomer core is less than 0° C., preferably less than −10° C., advantageously less than −20° C. and most advantageously less than −25° C. Preferably the elastomer core has a glass transition temperature between −120° C. and −10° C. and more particularly between −90° C. and −20° C.

As regards the shell, the shell polymer, which is optionally chemically grafted or crosslinked to the core rubbery stage, is preferably polymerized from at least one lower alkyl methacrylate such as methyl-, ethyl- or t-butyl methacrylate. Homopolymers of such methacrylate monomers can be used. Further, up to 40 percent by weight of the shell polymer can be formed from other monovinylidene monomers such as styrene, vinyl acetate, and vinyl chloride, methyl acrylate, ethyl acrylate, butyl acrylate, and the like.

As regards the thermoplastic resin according to the present invention, it can be chosen among but not limited to, polyvinyl chloride (PVC), polyesters as for example polyethylene terephtalate (PET) or polybutylen terephtalate (PBT) or polylactic acid (PLA), polystyrene (PS), polycarbonates (PC), polyethylene, polymethyl methacrylates(meth)acrylic copolymers, thermoplastic poly(methylmethacrylate-co-ethylacrylates), polyalkylene-terephtalates, poly vinylidene fluoride, les polyvinylidenchloride, polyoxymethylen (POM), semi-crystalline polyamides, amorphous polyamides, semi-crystalline copolyamides, amorphes copolyamides, polyetheramides, polyesteramides, copolymeres of styrene and acrylonitrile (SAN), and their respective mixtures. The mixtures for example may be PC/ABS, PC/polyester or PC/PLA just to mention a few.

According to a preferred embodiment the thermoplastic resin is polylactid acid (PLA). The term "polylactic acid" and "PLA" are used interchangeably to denote polymers having at least 50 percent by weight of polymerized lactic acid repeating units (i.e., those having the structure —OC(O)CH(CHs)—), irrespective of how those repeating units are formed into the polymer. The PLA resin preferably contains at least 80 percent, at least 90 percent, at least 95 percent or at least 98 percent by weight of those repeating units. The PLA resin may further contain repeating units derived from other monomers that are copolymerizable with lactide or lactic acid, such as alkylene oxides (including ethylene oxide, propylene oxide, butylene oxide, tetramethylene oxide, and the like) or cyclic lactones or carbonates. Repeating units derived from these other monomers can be present in block and/or random arrangements. These other repeating units suitably constitute up to about 10 percent by weight of the PLA resin, preferably from about 0 to about 5 percent by weight, especially from about 0 to 2 percent by weight, of the PLA resin.

The molecular weight and the molecular weight distribution of the polylactic acid are not particularly limited, as long as the resulting resin is moldable. The weight average molecular weight is preferable not less than 50 000 g/mol The amount of impact modifier according to the invention in the thermoplastic resin is between 0.5 wt % and 20 wt %, preferably between 0.5 wt % and 10%, by weight.

The impact modified thermoplastic resin composition in accordance with the present invention can be used and be brought into the desired form by known methods. Examples of such methods are milling, calendering, extruding (extrusion or coextrusion), injection moulding or spinning, and also extrusion blow moulding. The impact modified thermoplastic resin composition can also be processed to foam materials.

The impact modified thermoplastic resin composition in accordance with the invention are suitable, for example, for the manufacture of hollow articles (bottles, flasks and jars), packaging films (thermoformed or bended sheets), blown films, pipes, foam materials, heavy rigid profiles (window frames), transparent-wall profiles, construction profiles, sidings, fittings, office films, and apparatus enclosures (computers, domestic appliances).

Preferably the impact modified thermoplastic resin composition in accordance with the invention is used in form of extruded, blown moulded or calendered films or injected parts.

The present invention also relates to articles comprising at least one thermoplastic resin and at least one impact modifier according to the present invention, and optionally one or more additive(s) and/or co-stabiliser(s).

According to a preferred embodiment of the invention, the article is a rigid or semi-rigid or flexible, opaque or transparent film, especially those chosen from among rigid or semi-rigid or flexible, opaque or transparent films, shrink-films, adhesive films; rigid or semi-rigid, opaque or transparent sheets, fittings, profiles (window, in-door), edge-bands.

Preferably, the article is an opaque or transparent rigid or semi-rigid or transparent film, which may be advantageously used for thermoforming (or not) and preparing food packaging, pharmaceutical blisters, plastic cards (such as credit cards), furniture films and technical packaging films, and generally all kinds of opaque and transparent films.

By the term "transparent" as used is denoted that at least 80%, preferably 90% of the visible light passes.

Used Materials

| Abbreviations | |
| --- | --- |
| BA | butyl acrylate |
| MMA | methyl methacrylate |
| 2-EHA | 2 ethyl hexyl acrylate |
| PHA | propyl heptyl acrylate |
| 2-OA | 2-octyl acrylate |
| ALMA | Allyl Methacrylate |
| PLA | polylactic acid the grades Ingeo ® 2002D and NaturePlast PLI05 from NatureWorks were used. |

Methods

Particle Size Analysis

With Zetasizer: The weight average particle size and particle size distribution is measured with a Zetasizer 5000 equipment, after latex dilution in order to adjust the concentration needed in the cell used for the measure.

The glass transitions (Tg) of the core and of the core-shell are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Gardner Impact Strength

Samples are 40×40 mm sheet specimens that are cut and impacted plastic specimen by means of a striker impacted by a falling weight (Gardner Impact) following ASTM D5420-04 standard. Striker falling weight characteristics: 6.350 mm diameter, 1.82 kg Optical Properties Measurement:

500 microns thick sheets are then characterized by transparency, haze and clarity measurements, using a Haze-Gard Plus (CIE-C).

EXAMPLES

Synthesis of Impact Modifiers

The following procedure was used to synthesize a multi-stage core shell impact modifier having an elastomeric or soft core (stage 1) and a hard final shell (stage 2)

The weight ratio of the 2 stages are 80//20
The compositions of the 2 stages are
Stage 1: 99.25/0.75 rubber monomer/ALMA
Stage 2: 99.8/0.2 MMA/ALMA
where, MMA=methyl methacrylate Rubber monomer=butyl acrylate (BA) or 2octyl acrylate (2-OA) or 2-ethyl hexyl acrylate (2-EHA) or propyl heptyl acrylate (PHA) or mixtures thereof ALMA=allyl methacrylate as crosslinker To adjust the final size of the impact modifier, a seed is needed. The seed could have a particle size distribution between to 150 nm, the size of the seed being adjusted by the surfactant amount. The seed use the same monomer as the stage 1 and will be polymerized in the same way. The particle size distribution of the final impact modifier will depend on the amount of the seed.

The seed is introduced first with some water. The monomer charge of Stage 1, emulsified in water using sodium dodecyl benzene sulfonate as the emulsifier and using potassium carbonate to control the pH, was polymerized in 3 hours using a redox initiator potassium persulfate/sodium metabisulfite at a temperature around 80° C. The Stage 2 monomers, emulsified in water using sodium dodecyl benzene sulfonate as the emulsifier, controlling the amount of soap added to prevent the formation of a significant number of new particles, was polymerized in 1 hour using a redox initiator potassium persulfate/sodium metabisulfite at a temperature around 80° C.

The same procedure is used for the 5 samples.

The table 1 describes the composition, particle size and Tg of the different core-shell impact modifiers:

TABLE 1

|  | Sample 1 | Sample 2 | Sample 3 | Sample 4 | Sample 5 |
|---|---|---|---|---|---|
| Allyl Methacrylate (wt %) Core Shell ratio | 0.75 | 0.75 | 0.75 | 0.75 | 0.75 |
| BA/MMA | 80/20 | | | | |
| 2-EHA/MMA | | 80/20 | | | |
| 2-OA/MMA | | | 80/20 | | |
| PHA/MMA | | | | 80/20 | |
| 2OA-BA/MMA | | | | | 40-40/20 |
| Particle Size (nm)zetasizer | 300 | 294 | 341 | 347 | 334 |
| Particle Size (nm)CHDF | | | 301 | | 325 |
| Particle Size (nm)AFM | 301 | | | | 345 |
| Rubber Tg (° C.) | −40 | −53 | −47 | −51.7 | −38.3 |

The impact modifiers samples of table 1 are evaluated in PLA (sheets and films)

PLA Film Composition:

PLA granules are blended with 3 wt %, 5 wt % and 7 wt % respectively of impact modifier (powder). The PLA contains a lubricating system and a processing aid for avoiding adhesion or sticking to the hot metal parts. An example is a mixture of 2 wt % Biostrenght®700 and 2 wt % of Biostrenght®900 from ARKEMA. The blend is then added on a two-roll mill to prepare the sheet.

PLA Sample Preparation:

PLA samples are prepared on a two-roll mill (Collin, Ø 150, L: 400) at 160° C., with 20% friction (front roll at 20 rpm, back roll at 24 rpm), 0.45 mm roll gap following the steps:

90 seconds at 8 rpm (front roll, 20% friction), roll gap: 0.3 mm
150 seconds at 20 rpm (front roll, 20% friction), roll gap: 0.55 mm Sheet is then removed from the two-roll mill at 8 rpm (front roll, 20% friction), roll gap: 0.45 mm Sample sheet thickness is then accurately measured with an average value around 500 microns The results of the evaluation of the 5 samples are detailed in the table 2:

TABLE 2

|  | Example 6 No Modifier | Example 1 with Sample 1 | Example 2 with Sample 2 | Example 3 with Sample 3 | Example 4 with Sample 4 | Example 5 with Sample 5 |
|---|---|---|---|---|---|---|
| Film processing quality | ***** | ***** | ***** | ***** | ***** | ***** |
| Bank homogeneity | ***** | ***** | ***** | ***** | ***** | ***** |
| Plate out (residual on the rolls) | ***** | **** | * | * | * | *** |
| Visual quality of the film | ***** | **** | * | ** | * | **** |

* Poor to ***** Excellent

The data of the table 2 shows that OA based core alone leads to slightly poorer film quality, while the OA/BA copolymer as excellent film quality, in comparison with BA based rubber cores, while 2-EHA and PHA based rubber cores leads to poor visual film quality.

TABLE 3

|  | Example 1 | Example 2 | Example 3 | Example 4 | Example 5 |
|---|---|---|---|---|---|
| Gardner Impact at 3% load (in/lbf) | 7.8 | 8.4 | 8.62 | 5.74 | 13.6 |
| Gardner Impact at 5% load (in/lbf) | 9.0 | 9.44 | 15.92 | 8.3 | 29.53 |
| Garder Impact at | 18.84 | 22.43 | 26.84 | 12.95 | 34.80 |

TABLE 3-continued

|  | Example 1 | Example 2 | Example 3 | Example 4 | Example 5 |
|---|---|---|---|---|---|
| 7% load (in/lbf) |  |  |  |  |  |

The gardner impact without impact modifier sample is <1.
The data of the table 3 shows that the best Gardner impact is obtained with 2-OA and 2-OA/BA rubber cores, which is significantly better then samples with rubber cores based on BA and 2-EHA.

TABLE 4

| Transparency [%] at | Example 1 | Example 2 | Example 3 | Example 4 | Example 5 |
|---|---|---|---|---|---|
| 3% load | 91.3 | 92.6 | 93.4 | 92.2 | 93.8 |
| 5% load | 92.5 | 91.4 | 92.5 | 92.4 | 93.3 |
| 7% load | 92.4 | 91.4 | 93.1 | 91.9 | 92.7 |

The transparency without impact modifier sample is 92.5
The data of the table 4 show that the transparency of all samples is comparable.

TABLE 5

| Clarity [%] at | Example 1 | Example 2 | Example 3 | Example 4 | Example 5 |
|---|---|---|---|---|---|
| 3% load | 96.6 | 95.4 | 94.4 | 56.5 | 94.7 |
| 5% load | 95.1 | 72.2 | 87.5 | 49.3 | 97.0 |
| 7% load | 94.8 | 58.8 | 82.2 | 46.8 | 96.5 |

The clarity without impact modifier sample is 95.4
The data of the table 5 show that the clarity of the samples containing 2-octyl acrylate is closer the clarity of the sample without impact modifier.

TABLE 6

| Haze [%] at | Example 1 | Example 2 | Example 3 | Example 4 | Example 5 |
|---|---|---|---|---|---|
| 3% load | 9.79 | 14.65 | 9.33 | 17.2 | 8.93 |
| 5% load | 10.5 | 16.7 | 9.67 | 22.1 | 9.65 |
| 7% load | 12.7 | 21.1 | 15.3 | 24.8 | 12.8 |

The haze without impact modifier sample is 6.48
The samples containing the impact modifiers comprising 2-octyl acrylate have a higher impact strength then the samples containing an impact modifier without any 2-octyl acrylate at the same load, while still having a haze value at the same level as the samples with containing the butyl acrylate based impact modifier.

The invention claimed is:

1. Impact modifier comprising 2-octylacrylate, wherein the weight ratio of the 2-octylacrylate in the impact modifier is at least 10 wt %, wherein the impact modifier is a polymeric particle having a core shell structure, and wherein the 2-octylacrylate is in the core.

2. Impact modifier comprising 2-octylacrylate according to claim 1, wherein the weight ratio of the 2-octylacrylate in the impact modifier is between 30 wt % and 95 wt %.

3. Impact modifier according to claim 1, wherein the core of the polymer particle has a glass transition temperature less than 0° C.

4. Impact modifier according to claim 1, wherein the 2-octylacrylate is copolymerized with another (meth)acrylic monomer.

5. Impact modifier according to claim 4, wherein the other (meth)acrylic monomer is selected from the group consisting of n-butyl acrylate, n-pentyl acrylate, n-hexyl acrylate, n-heptyl acrylate, 2-ethylhexylacrylate, and n-octyl acrylate and mixtures thereof.

6. Impact modifier according to claim 4, wherein the other (meth)acrylic monomer is selected from the group consisting of butyl acrylate, 2-ethyl hexyl acrylate or mixtures thereof.

7. A composition comprising at least one thermoplastic resin and at least one impact modifier according to claim 1.

8. The composition according to claim 7, wherein the thermoplastic resin is selected from the group consisting of polyvinyl chloride (PVC), polyesters, polyethylene terephtalate (PET), polybutylene terephtalate (PBT), polylactic acids (PLA), polystyrene (PS), polycarbonate (PC), polyethylene, polymethyl methacrylate, (meth)acrylic copolymers, thermoplastic poly(methylmethacrylate-co-ethylacrylates), polyalkylene-terephtalates, poly vinylidene fluoride, poly vinylidene chloride, polyoxymethylene (POM), semi-crystalline polyamides, amorphous polyamides, semi-crystalline copolyamides, amorphous copolyamides, polyetheramides, polyesteramides, copolymers of styrene and acrylonitrile (SAN), and mixtures thereof.

9. The composition according to claim 8, wherein the thermoplastic resin is polylactic acid.

10. The composition according to claim 7, wherein the thermoplastic resin is used in film form or an injection moulded part.

11. The composition according to claim 7, wherein the thermoplastic resin is transparent.

12. An article comprising at least one thermoplastic resin and at least one impact modifier according to claim 1.

13. An article according to claim 12, wherein the thermoplastic resin is selected from the group consisting of polyvinyl chloride (PVC), polyesters, polyethylene terephtalate (PET), polybutylene terephtalate (PBT), polylactic acids (PLA), polystyrene (PS), polycarbonate (PC), polyethylene, polymethyl methacrylate, (meth)acrylic copolymers, thermoplastic poly(methylmethacrylate-co-ethylacrylates), polyalkylene-terephtalates, poly vinylidene fluoride, poly vinylidene chloride, polyoxymethylene (POM), semi-crystalline polyamides, amorphous polyamides, semi-crystalline copolyamides, amorphous copolyamides, polyetheramides, polyesteramides, copolymers of styrene and acrylonitrile (SAN), and mixtures thereof.

14. Article according to claim 12 in form of an opaque or transparent film or injection moulded part.

15. Impact modifier according to claim 1, wherein the core consists of 2-octylacrylate homopolymer.

16. Impact modifier according to claim 4, wherein the core is an all acrylic copolymer.

* * * * *